(12) United States Patent
Rao et al.

(10) Patent No.: US 9,692,586 B2
(45) Date of Patent: Jun. 27, 2017

(54) FLEXIBLE REAL TIME SCHEDULER FOR TIME DIVISION DUPLEXING AND/OR FREQUENCY DIVISION DUPLEXING

(71) Applicant: NATIONAL INSTRUMENTS CORPORATION, Austin, TX (US)

(72) Inventors: Yong Rao, Austin, TX (US); Ahsan Aziz, Austin, TX (US); Eckhard Ohlmer, Dresden (DE); James W. McCoy, Austin, TX (US)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 133 days.

(21) Appl. No.: 14/691,339

(22) Filed: Apr. 20, 2015

(65) Prior Publication Data

US 2015/0305029 A1    Oct. 22, 2015

Related U.S. Application Data

(60) Provisional application No. 61/982,268, filed on Apr. 21, 2014.

(51) Int. Cl.

| H04W 72/04 | (2009.01) |
|---|---|
| H04L 5/22 | (2006.01) |
| H04B 7/26 | (2006.01) |
| H04L 1/00 | (2006.01) |
| H04W 72/12 | (2009.01) |
| H04L 5/14 | (2006.01) |

(52) U.S. Cl.
CPC ............. *H04L 5/22* (2013.01); *H04B 7/2656* (2013.01); *H04L 1/00* (2013.01); *H04W 72/1242* (2013.01); *H04L 5/14* (2013.01)

(58) Field of Classification Search
CPC .. H04W 72/0446; H04W 72/0453; H04L 5/22
See application file for complete search history.

(56) References Cited

U.S. PATENT DOCUMENTS

| 6,674,750 | B1 * | 1/2004 | Castellano | ............ H04J 3/1682 370/352 |
|---|---|---|---|---|
| 7,257,096 | B2 * | 8/2007 | Kim | ...................... H03G 3/3047 370/318 |
| 8,036,137 | B2 * | 10/2011 | Bossler | ............. H04W 56/0065 370/252 |
| 8,599,822 | B2 * | 12/2013 | Castagnoli | .............. H04L 45/02 370/238 |
| 8,873,463 | B2 | 10/2014 | Seo | |

(Continued)

*Primary Examiner* — Rasheed Gidado
(74) *Attorney, Agent, or Firm* — Meyertons Hood Kivlin Kowert & Goetzel, P.C.; Jeffrey C. Hood; Mark K. Brightwell

(57) ABSTRACT

A flexible real-time scheduler for a wireless communication node, enabling the node to communicate with a remote node using dynamically variable frame structure. The scheduler continuously receives map information defining the frame structure of frames in a frame sequence. Each frame includes a plurality of slots (e.g., time slots or frequency slots). The map information specifies for each slot of each frame whether the slot is to be a transmit slot or a receive slot. The scheduler drives a transmitter to transmit during the slots assigned for transmission, and drives a receiver to receive during the slots assigned for reception. (The number of slots per frame and the size of each slot are also configurable.)

20 Claims, 10 Drawing Sheets

(56) References Cited

U.S. PATENT DOCUMENTS

| | | |
|---|---|---|
| 9,407,357 B1* | 8/2016 | Roggendorf ......... H04B 7/2693 |
| 9,436,633 B2* | 9/2016 | Segev ..................... G06F 13/36 |
| 2005/0078630 A1* | 4/2005 | Choi ................. H04W 72/1289 |
| | | 370/329 |
| 2013/0242823 A1 | 9/2013 | Lin |
| 2014/0010213 A1 | 1/2014 | Wang |

* cited by examiner

400 ⟶

```
┌─────────────────────────────────────────────────────────────────────┐
│   receive a set of one or more transmit slot indices for a given    │
│   frame in a sequence of frames, wherein each of the frames         │
│   includes a common number $N_S$ of slots, wherein the one or more  │
│   transmit slot indices indicate which of the $N_S$ slots of the    │
│   given frame are to be transmit slots   410                        │
└─────────────────────────────────────────────────────────────────────┘
                                  ↓
┌─────────────────────────────────────────────────────────────────────┐
│   generate a first sequence of $N_S$ pulses for the given frame,    │
│   wherein each pulse of said first sequence indicates a start of a  │
│   corresponding slot within the given frame   415                   │
└─────────────────────────────────────────────────────────────────────┘
                                  ↓
┌─────────────────────────────────────────────────────────────────────┐
│   for each pulse of the first sequence, perform a set of            │
│   operations, wherein the set of operations includes:   420         │
│                                                                     │
│   determining if an index n of the pulse within the first sequence  │
│   equals a current one of the transmit slot indices; and            │
│                                                                     │
│   in response to determining that the index n of the pulse within   │
│   the first sequence equals the current transmit slot index,        │
│   processing payload data to obtain samples for the $n^{th}$ slot   │
│   of the given frame using first transmission parameters            │
│   corresponding to said current transmit slot index, and            │
│   transmitting said samples within the $n^{th}$ slot of the given   │
│   frame using second transmission parameters corresponding to       │
│   said current transmit slot index.                                 │
└─────────────────────────────────────────────────────────────────────┘
```

```
receive one or more receive slot indices for a given frame in a sequence of
frames, wherein the one or more receive slot indices indicate which of $N_S$
slots of the given frame are to be receive slots    460
```

↓

```
generate a sequence of $N_S$ pulses for the given frame, wherein each pulse of
said pulse sequence indicates the start of a corresponding slot within the
given frame 465
```

↓ for each pulse of the pulse sequence, perform a set of operations, wherein
the set of operations includes:    470 determining if an index m of the pulse within the pulse sequence equals a
current one of the receive slot indices; and in response to determining that the index m of the pulse within the pulse
sequence equals the current receive slot index, processing one or more
received analog signals using first receive parameters corresponding the
current receive slot index to obtain samples for the $m^{th}$ slot, and processing
the samples for the $m^{th}$ slot using second receive parameters corresponding
to the current receive slot index to obtain received payload data for the $m^{th}$
slot.

Fig. 4B

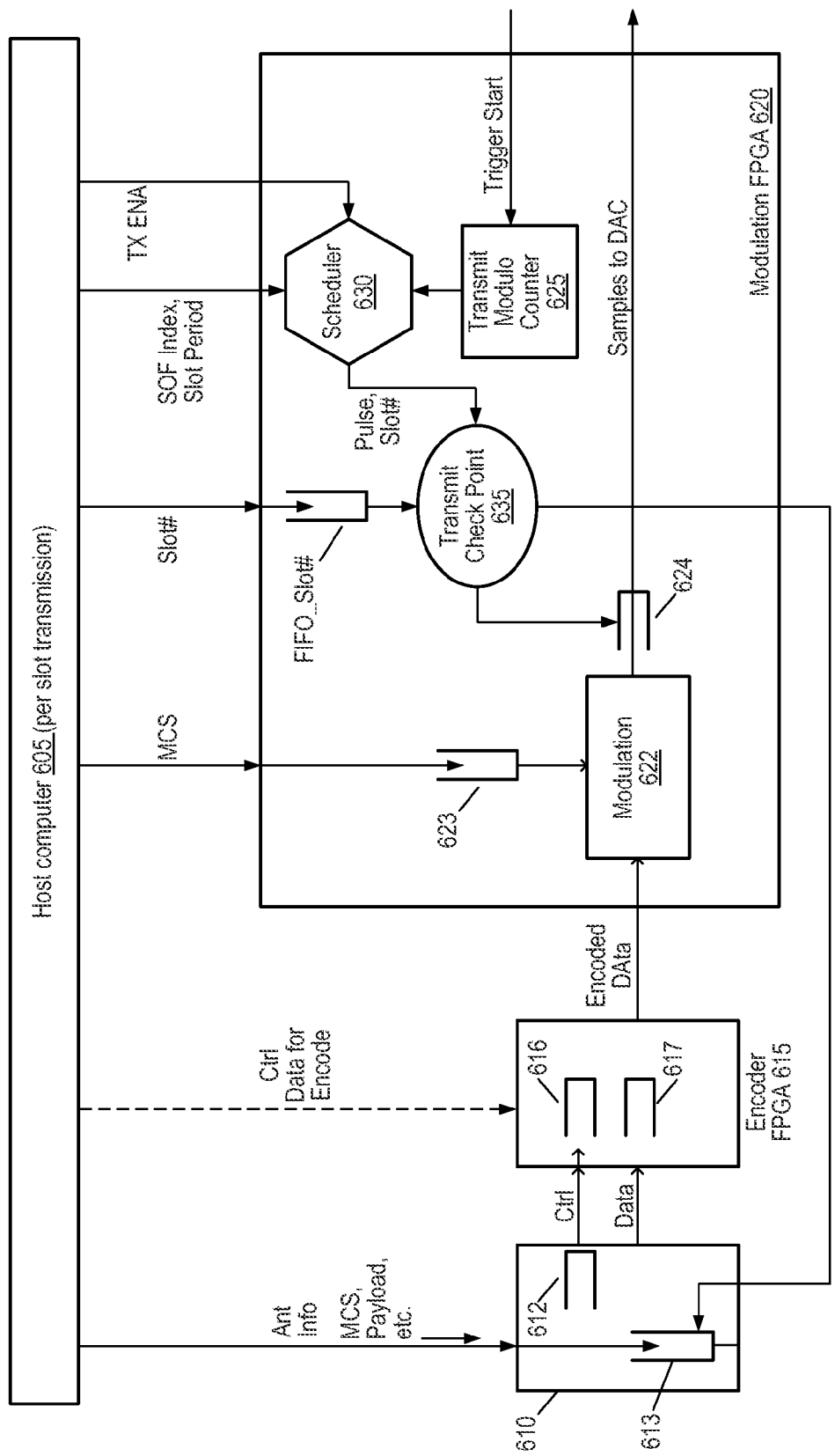
Fig. 6: Transmitter Side

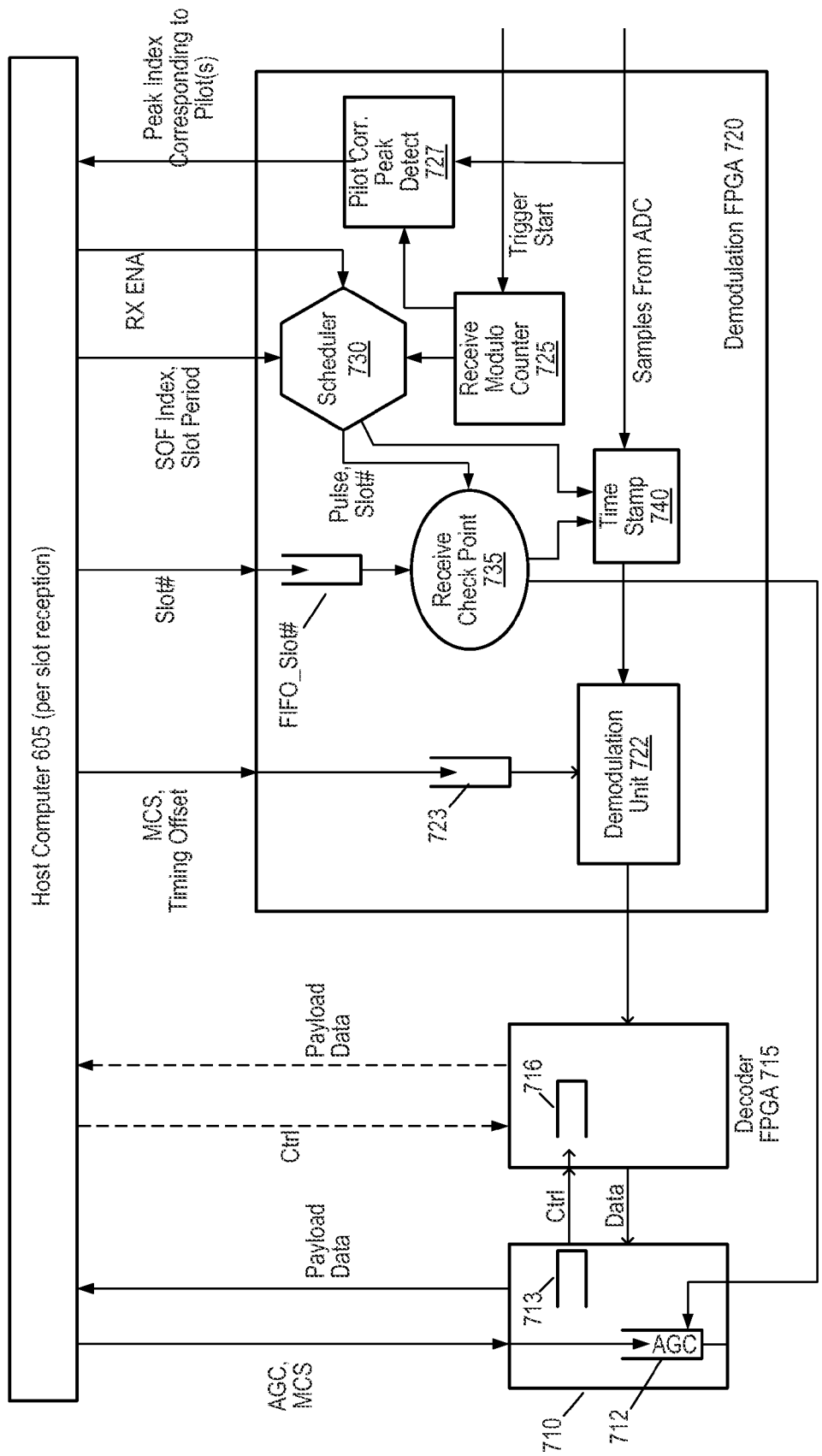
Fig. 7: Receiver Side

FLEXIBLE REAL TIME SCHEDULER FOR TIME DIVISION DUPLEXING AND/OR FREQUENCY DIVISION DUPLEXING

PRIORITY DATA

This application claims benefit of priority to U.S. Provisional Application No. 61/982,268, titled "Real Time Flexible Scheduler for TDD and FDD", filed Apr. 21, 2014, invented by Yong Rao, Ahsan Aziz, Eckhard Ohlmer and James W. McCoy, which is hereby incorporated by reference in its entirety as though fully and completely set forth herein.

FIELD OF THE INVENTION

The present invention relates to the field of wireless communication, and more specifically, to scheduling mechanisms for a flexible real time duplexing of communications between wireless communication nodes.

DESCRIPTION OF THE RELATED ART

In wireless communication systems, an access point (or base station) wirelessly communicates with one or more user equipment (UE) devices. The access point sends downlink signals to the UE devices, and receives uplink signals from the UE devices. To prevent the downlink signals and uplink signals from interfering with each other, some form of duplexing may be employed, e.g., time division duplexing (TDD) or frequency division duplexing (FDD).

In time division duplexing, downlink transmissions and uplink transmissions are separated in different time intervals. For example, within a frame, one time interval may be dedicated for downlink transmission and another time interval may be dedicated for uplink transmission. However, unfortunately, the structure of the uplink time interval and downlink time interval is fixed, having been defined by the wireless communication standard to which the wireless communication system conforms. In other words, the relative position and duration of the uplink time interval and downlink time interval are fixed, or limited to a small number of options.

In frequency division duplexing, downlink transmissions and uplink transmissions are separated in different frequency intervals. For example, within a frame (or frequency band), one frequency subband may be dedicated for downlink transmission and another frequency subband may be dedicated for uplink transmission. However, unfortunately, the structure of the uplink subband and downlink subband is fixed, having been defined by the wireless communication standard to which the wireless communication system conforms. In other words, the relative position and frequency size of the uplink subband and downlink subband are fixed, or limited to a small number of options.

Thus, there exists a need for mechanisms capable of providing configurable (e.g., dynamically configurable) duplexing of uplink transmissions and downlink transmissions for a wireless communication node such as an access point or UE device.

SUMMARY

Various embodiments of a system and method for flexible TDD and/or FDD communication in a wireless communications system are presented below.

In one set of embodiments a method for operating a wireless communication node may include the following actions. The method may be performed to enable dynamic control of frame structure.

The method may include receiving a set of one or more transmit slot indices for a given frame in a sequence of frames, wherein each of the frames includes a common number $N_S$ of slots, wherein the one or more transmit slot indices indicate which of the $N_S$ slots of the given frame are to be transmit slots;

The method may also include generating a first sequence of $N_S$ pulses for the given frame, wherein each pulse of said first sequence indicates a start of a corresponding slot within the given frame;

The method may also include, for each pulse of the first sequence, performing operations including: (1) determining if an index n of the pulse within the first sequence equals a current one of the transmit slot indices; and (2) in response to determining that the index n of the pulse within the first sequence equals the current transmit slot index, processing payload data to obtain samples for the nth slot of the given frame using first transmission parameters corresponding to said current transmit slot index, and transmitting said samples within the nth slot of the given frame using second transmission parameters corresponding to said current transmit slot index.

The method may also include receiving one or more receive slot indices for the given frame, wherein the one or more receive slot indices indicate which of the $N_S$ slots of the given frame are to be receive slots, wherein each slot of the given frame is assigned to be either a receive slot or a transmit slot.

The method may also include generating a second sequence of $N_S$ pulses for the given frame, wherein each pulse of said second sequence indicates the start of the corresponding slot within the given frame.

The method may also include, for each pulse of the second sequence, performing operations including: (3) determining if an index m of the pulse within the second sequence equals a current one of the receive slot indices; (4) in response to determining that the index m of the pulse within the second sequence equals the current receive slot index, processing one or more received analog signals using first receive parameters corresponding the current receive slot index to obtain samples for the $m^{th}$ slot, and processing the samples for the $m^{th}$ slot using second receive parameters corresponding to the current receive slot index to obtain received payload data for the $m^{th}$ slot.

BRIEF DESCRIPTION OF THE DRAWINGS

A better understanding of the present invention can be obtained when the following detailed description of the preferred embodiment is considered in conjunction with the following drawings.

FIG. 4A illustrates one embodiment of a method for operating a transmitter to enable dynamic control of frame structure for transmitted frames.

FIG. 4B illustrates one embodiment of a method for operating a receiver to enable dynamic control of frame structure for received frames.

FIG. 6 illustrates the transmitter side of a system for real-time flexible scheduling of transmission and reception.

FIG. 7 illustrates the receiver side of a system for real-time flexible scheduling of transmission and reception.

Figure 1:
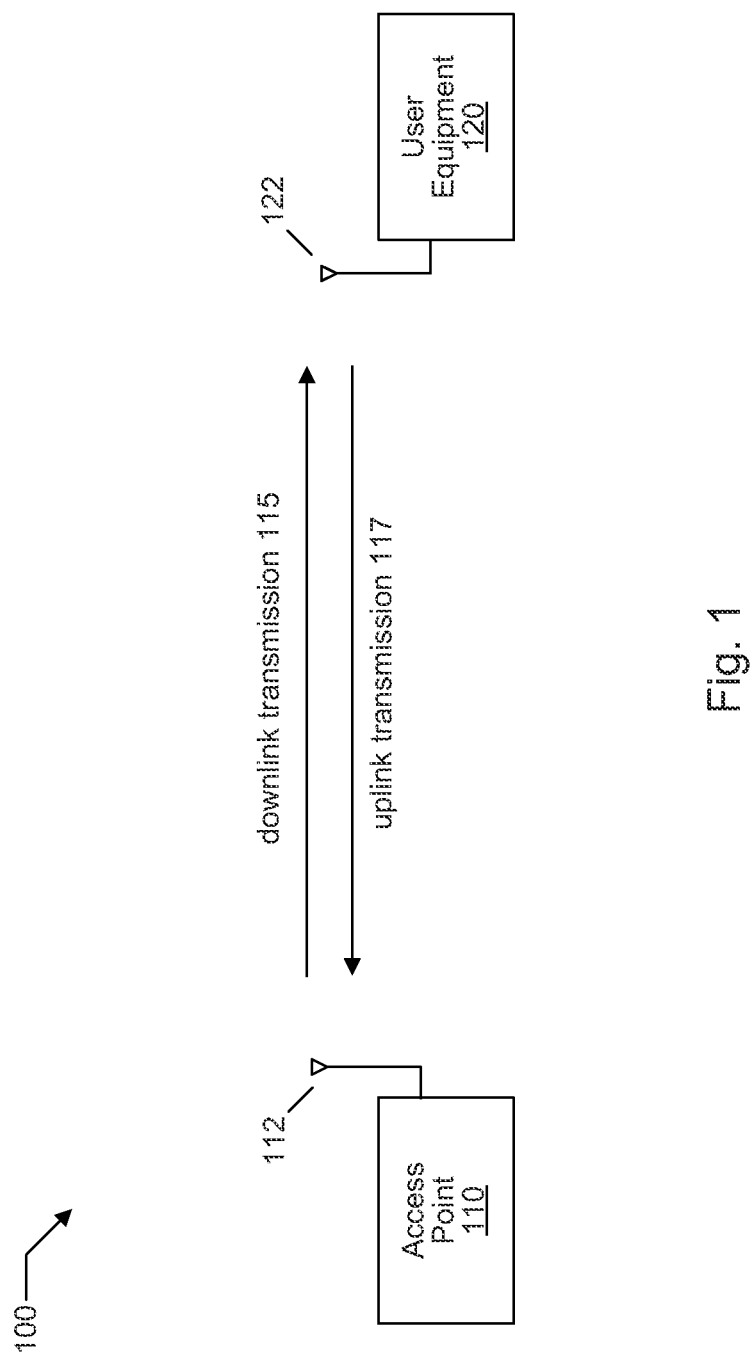
FIG. 1 shows one embodiment of a communication system 100 includes an access point 110 and a user equipment device 120.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terminology

The following is a glossary of terms used in the present application:

Memory Medium—Any of various types of non-transitory computer accessible memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Wireless—refers to a communications, monitoring, or control system in which electromagnetic or acoustic waves carry a signal through space rather than along a wire.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory memory medium may be configured so that it stores program instructions and/or data, where the program instructions, when executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a non-transitory memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on an electronics card or board, an application-specific computer in a box, a server computer, a client computer, a hand-held device, a tablet computer, a wearable computer, etc.

In some embodiments, a set of computers distributed across a network may be configured to partition the effort of executing a computational method, e.g., any of the method embodiments described herein, or, any combination of the method embodiments described herein, or, any subset of any of the method embodiments described herein, or, any combination of such subsets.

Wireless Communication System

In one set of embodiments, a wireless communication system 100 may include an access point 110 (or base station) and a user equipment device 120 (or a plurality of user equipment devices). The access point includes an antenna system 112 (including one or more antennas) which is used to send downlink transmissions 115 to the user equipment and to receive uplink transmissions 117 from the user equipment. The user equipment 122 includes an antenna system 122 (including one or more antennas) which is used to receive the downlink transmissions and send the uplink transmissions. The uplink transmissions and downlink transmissions may be duplexed in time, in frequency, or in both time and frequency.

The wireless communication system may be configured to provide flexible real-time duplexing of downlink transmission and uplink transmissions. In some embodiments, a wireless communication node (the access point or a UE device) may be configured to communicate using a sequence of frames, wherein the duplexing structure of the frames is dynamically configurable. Each frame may be partitioned into a number $N_S$ of time slots, e.g., slots of equal duration. The number $N_S$ is configurable to any desired positive integer value. The slot duration $T_{slot}$ is configurable to any desired value.

For each frame k of the frame sequence, there is a map $MAP_k$ that assigns each slot $S_n$ within the frame k to one of uplink transmission or downlink transmission. The map $MAP_k$ is arbitrary. There are $2^{N_S}$ possibilities for $MAP_k$. Any one of those possibilities may be selected, e.g., by a processor controlling the wireless communication node. The selection may be governed by any one or more desired criteria, e.g., criteria such as: the amount of downlink data queued for transmission to the one or more UE devices; the amount of uplink data queued for transmission to the access point; the quality of service assigned to the UE device(s); the type of data being transmitted to/from the UE device(s), etc.

Furthermore, the map $MAP_k$ is dynamically configurable. In other words, the map $MAP_k$ may change for each frame of the frame sequence. Thus, the controlling processor is free to dynamically change the $MAP_k$ is response to changing conditions. For example, new UE devices may enter the cell of the access point, or, existing UE devices may start or stop processes that imply more or less demand for downlink transmission, or more or less demand for uplink transmission. The controlling processor may send the map $MAP_k$ to the wireless communication node in advance of the frame k being used for data transmission and/or reception.

Figure 2:
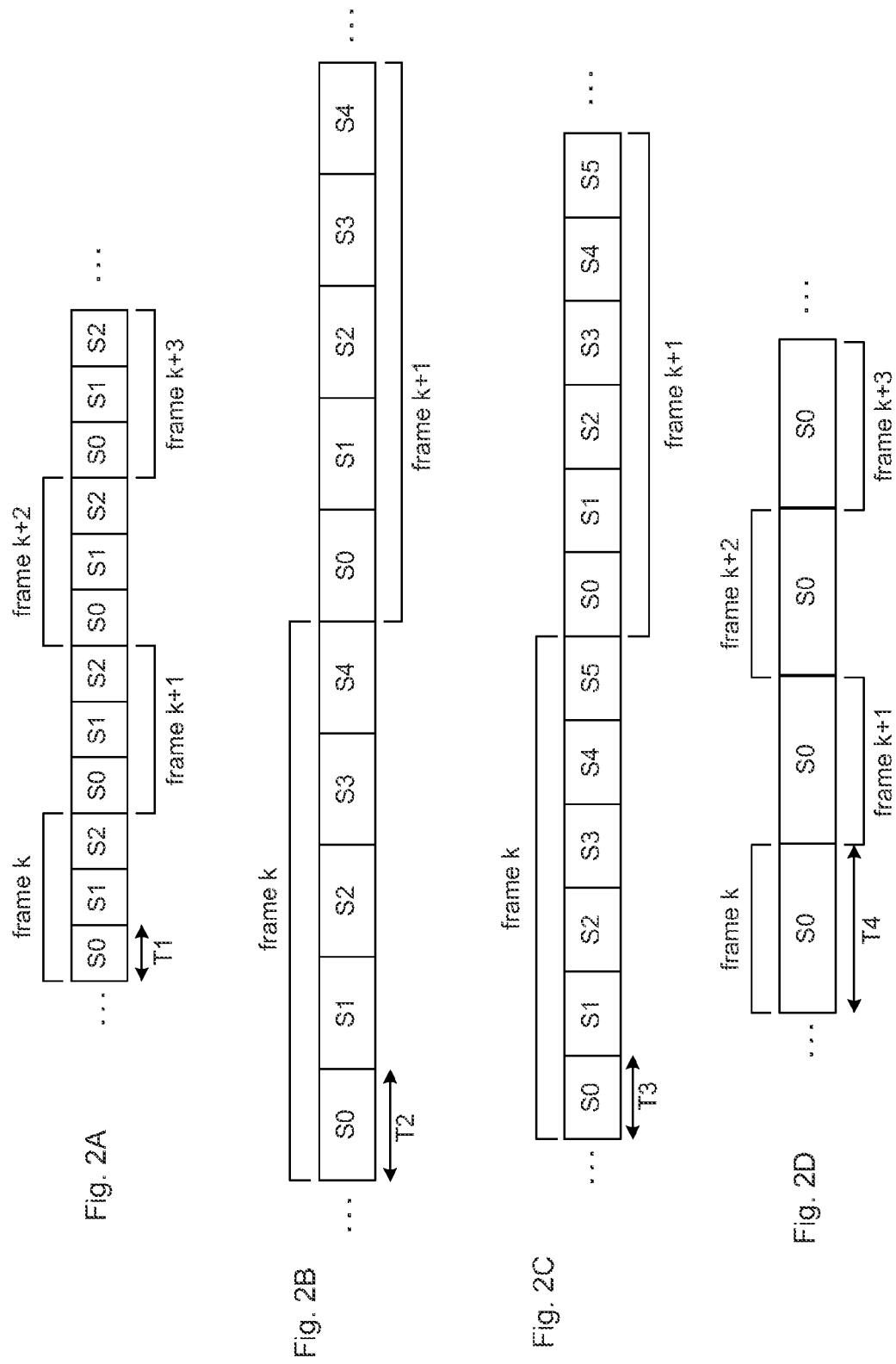
FIGS. 2A-2D show different examples of frame structure achievable using a flexible real-time scheduler according to one embodiment.

FIGS. 2A-2D illustrate a few examples within the vast space of possibilities. FIG. 2A illustrates the case where each frame of the frame sequence includes three slots (S0, S1, S2) with slot duration T1. ($N_S$=3.) FIG. 2B illustrates the case where each frame includes five slots (S0, S1, S2, S3, S4) with slot duration T2. FIG. 2C illustrates the case where each frame includes six slots (S0, S1, S2, S3, S4, S5) with slot duration T3. FIG. 2D illustrates the case where each slot includes only one slot (S0) with slot duration T4.

Figure 3:
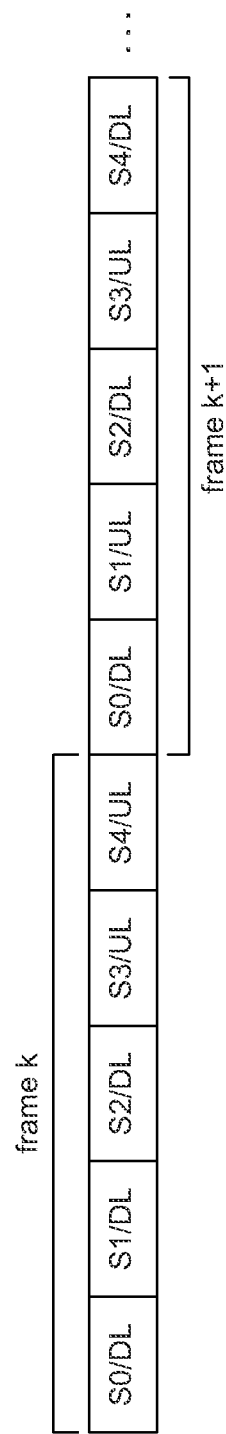
FIG. 3 illustrates the feature that frame structure may be dynamically changed from frame to frame in a frequency sequence, according to one embodiment of a flexible real-time scheduler.

FIG. 3 illustrates the dynamically variable nature of the $MAP_k$ with an example where each frame includes five slots (S0, S1, S2, S3, S4). In the frame k, the map $MAP_k$ specifies the assignment (DL,DL,DL,UL,UL) for the five respective slots, where DL denotes downlink transmission and UL denotes uplink transmission. In the frame k+1, the map $MAP_{k+1}$ has changed so that the assignment (DL,UL,DL,UL,DL) is in effect.

FIGS. 4A and 4B: Methods for Operating a Wireless Communication Node

In one of embodiments, a method 400 for operating a wireless communication node may include the actions shown in FIG. 4A, or any subset of those actions. (The method 400 may also include any subset of the features, elements and embodiments described above and described below in connection with FIGS. 4B through 8.) The method 400 may be performed to enable dynamic control of frame structure. The method 400 may be performed by a wireless communication system including a wireless transmitter and wireless receiver.

At 410, a set of one or more transmit slot indices for a given frame in a sequence of frames may be received. Each of the frames includes a common number $N_S$ of slots, wherein the one or more transmit slot indices indicate which of the $N_S$ slots of the given frame are to be transmit slots. The one or more transmit slot indices may be received from a controlling processor (e.g., a processor executing a real time operating system, or the processor of a host computer system), and stored in a local FIFO buffer. The one or more transmit slot indices may represent a subset of the set $\{0, 1, 2, \ldots, N_S-1\}$.

At 415, a first sequence of $N_S$ pulses for the given frame may be generated. Each pulse of said first sequence indicates a start of a corresponding slot within the given frame. The pulses may be generated by digital circuitry (e.g., by a portion of the modulation FPGA shown in FIG. 6).

At 420, a set $SET_{TX}$ of operations may be performed for each pulse of the first sequence. The set $SET_{TX}$ of operations may include: (a) determining if an index n of the pulse within the first sequence equals a current one of the transmit slot indices; and (b) in response to determining that the index n of the pulse within the first sequence equals the current transmit slot index, processing payload data to obtain samples for the $n^{th}$ slot of the given frame using first transmission parameters corresponding to said current transmit slot index, and transmitting said samples within the $n^{th}$ slot of the given frame using second transmission parameters corresponding to said current transmit slot index. The current transmit slot index is then discarded. (However, if said determination finds that the index n of the pulse is not equal to the current transmit slot index, the current transmit slot index is retained until a subsequent pulse that gives equality.)

In some embodiments, the wireless communication node is an access point (or base station) of a wireless communication network.

In some embodiments, the wireless communication node is a user equipment (UE) device, which is configured to wirelessly communicate with an access point (or base station) of a wireless communication network. The UE device may be a mobile device such as a mobile phone.

In some embodiments, the first transmit parameters include: one or more encoder control parameters used by an encoder unit to perform encoding on the payload data to obtain encoded data; and/or a modulation and coding scheme (MCS) used by a modulation unit to modulate the encoded data to obtain said samples for the $n^{th}$ slot.

In some embodiments, the second transmit parameters include: one or more transmit power parameters used by one or more respective RF amplifiers to transmit the samples within the $n^{th}$ slot; and one or more antenna parameters used by the transmitter to perform antenna beam steering.

In some embodiments, the method 400 also includes: performing 410, 415 and 420 for each of the frames in said sequence of frames. The set of one or more transmit slot indices may change between said given frame and a second of the frames of the sequence. For example, the set of one or more transmit slot indices may dynamically change from one frame to the next.

In some embodiments, each of the $N_S$ slots in each frame has the same size $N_{SlotSize}$. In these embodiments, the method 400 may also include: receiving the common number $N_S$ as an input parameter; receiving the size $N_{SlotSize}$; and configuring a counting unit to cyclically count through a range of integer values corresponding to a frame size. The frame size may be equal to the product of the common number $N_S$ and the size $N_{SlotSize}$. (In the context of time division duplexing, the size $N_{SlotSize}$ may be the same as the slot duration $T_{Slot}$ discussed above.)

In some embodiments, the $N_S$ slots of each frame are time slots, or frequency slots, or time-frequency slots.

In one set of embodiments, a method 450 for operating a wireless communication node may include the actions shown in FIG. 4B, or any subset of those actions. (The method 450 may also include any subset of the features, elements and embodiments described above and described below in connection with FIGS. 5A through 8.) The method 450 may be performed to enable dynamic control of frame structure for wireless communication using a sequence of frames. The method 450 may be performed by a wireless communication system including a wireless transmitter and wireless receiver. (Note that the method 450 and the above-described method 400 may be performed in parallel.)

At 460, one or more receive slot indices for the given frame in the frame sequence are received. The one or more receive slot indices indicate which of $N_S$ slots of the given frame are to be receive slots. Each slot of the given frame may be assigned to be either a receive slot or a transmit slot. (The one or more receive slot indices may be stored in a local FIFO buffer, e.g., a FIFO buffer separate from the one used to store the one or more transmit slot indices.)

At 465, a sequence of $N_S$ pulses for the given frame is generated, wherein each pulse of said sequence indicates the start of a corresponding slot within the given frame.

At 470, for each pulse of the sequence of pulses, a set $SET_{RX}$ of operations may be performed. The set $SET_{RX}$ of operations may include: (a) determining if an index m of the pulse within the pulse sequence equals a current one of the receive slot indices; and (b) in response to determining that the index m of the pulse equals the current receive slot index, processing one or more received analog signals using first receive parameters corresponding the current receive slot index to obtain samples for the $m^{th}$ slot, and processing the samples for the $m^{th}$ slot using second receive parameters corresponding to the current receive slot index, to obtain received payload data for the $m^{th}$ slot. The current receive slot index is then discarded. (However, if said determination finds that the index m of the pulse is not equal to the current receive slot index, the current receive slot index is retained until a subsequent pulse that gives equality.)

In some embodiments, the first receive parameters include one or more automatic gain control values for one or more respective analog amplifiers that amplify the one or more received analog signals.

In some embodiments, the second receive parameters include: a modulation and coding scheme (MCS) used by a demodulation unit to demodulate the samples for the $m^{th}$ slot to obtain demodulated data for the $m^{th}$ slot; and/or one or more decoder control parameters used by a decoder unit to perform decoding on the demodulated data to obtain the received payload data for the $m^{th}$ slot.

Figure 5A:
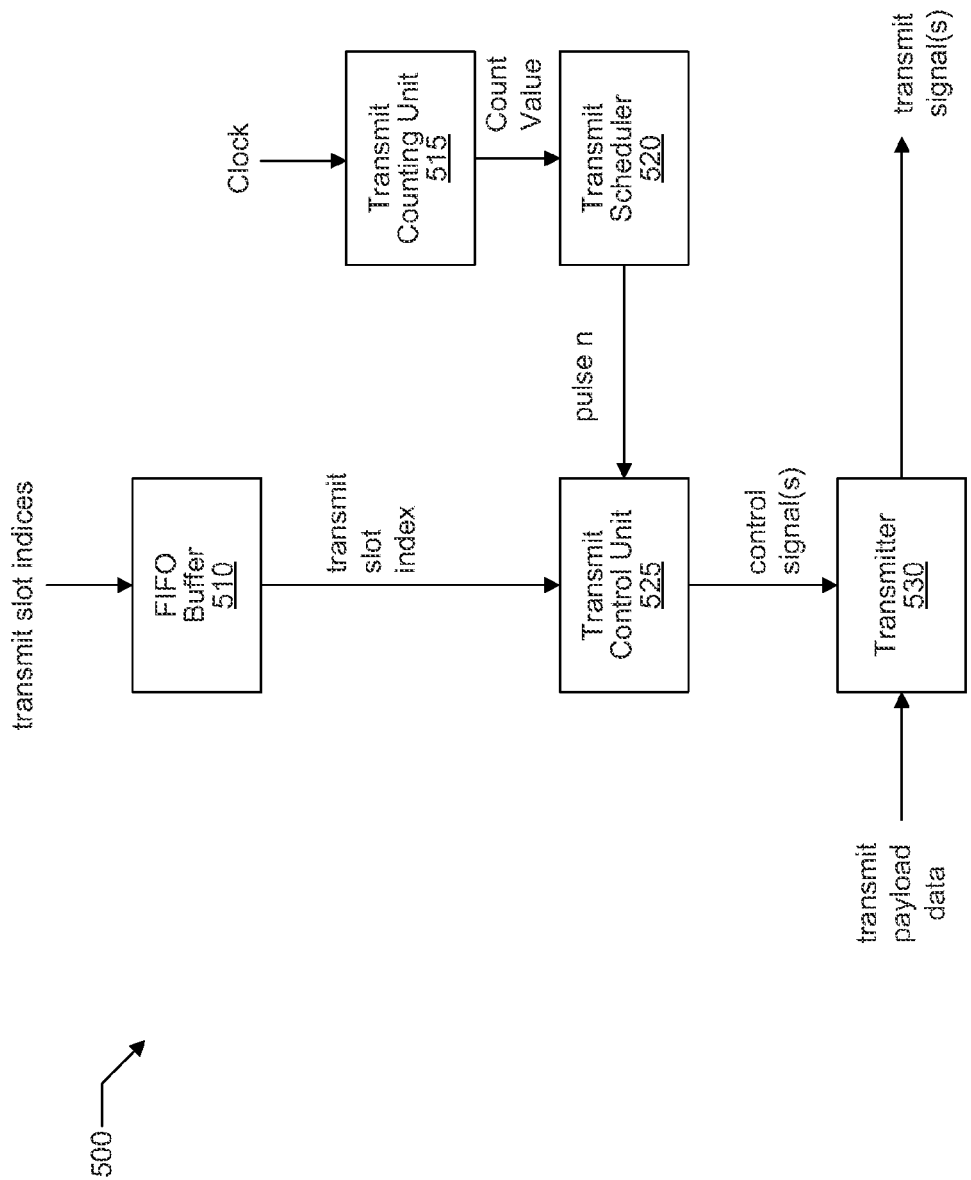
FIG. 5A illustrates one embodiment of a wireless communication node capable of dynamically controlling frame structure for transmitted frames.
Figure 5B:
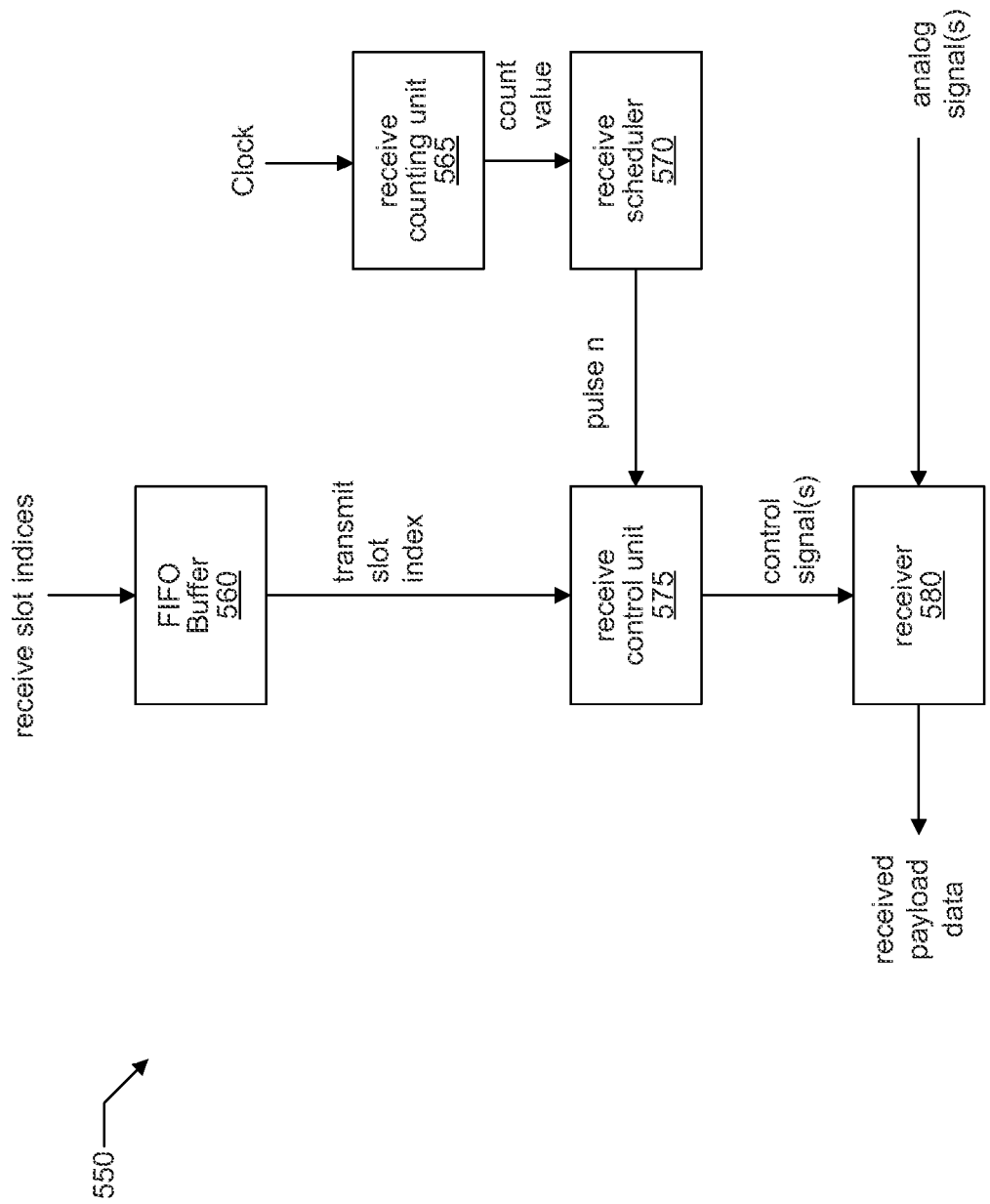
FIG. 5B illustrates one embodiment of a wireless communication node capable of dynamically controlling frame structure for received frames.

FIGS. 5A and 5B: Wireless Communication Node

In one set of embodiments, a wireless communication node 500 may be configured as shown in FIG. 5A. The wireless communication node 500 may include a FIFO buffer 510, a transmit counting unit 515, a transmit scheduler 520 and a transmit control unit 525, or any subset of the foregoing. (The node 500 may also include any subset of the features described above and described below in connection with FIGS. 5B through 8.)

The FIFO buffer 510 may be configured to receive a set of one or more transmit slot indices for a given frame in a sequence of frames. Each of the frames may include a common number $N_S$ of slots. The one or more transmit slot indices indicate which of the $N_S$ slots of the given frame are to be transmit slots. The one or more transmit slot indices may be received from a controlling processor (e.g., a processor executing a real-time operations system, or a host computer).

The transmit counting unit 515 may be configured to cyclically increment a count value through a range of integers based on a configurable frame size $N_{Frame}$, in response to active edges (i.e., rising edges, or alternatively, falling edges) of a clock signal. For example, the transmit counting unit 515 may cyclically count through the range $\{0, 1, 2, \ldots, N_{Frame}-1\}$.

In this case, the term "cyclically counting" implies that the next state of the count value after reaching the state $N_{Frame}-1$ is zero.

For each frame of the sequence of frames, the transmit scheduler 520 may be configured to generate a first sequence of $N_S$ pulses, with each pulse of the first sequence indicating a start of a corresponding slot within the frame. An initial one of the pulses of the first sequence occurs when the count value equals a configurable start-of-frame (SOF) index.

For each pulse of the first sequence, the transmit control unit 515 may be configured to: (a) determine if an index n of the pulse within the first sequence equals a current one of the transmit slot indices; and (b) in response to determining that the index n of the pulse within the first sequence equals the current transmit slot index, direct transmission of payload data within the $n^{th}$ slot of the given frame. The wireless communication node 500 may include a wireless transmitter 530 coupled to receive a control signal(s) from the transmit control unit. The transmitter 530 transmits the payload data within the $n^{th}$ slot of one or more transmit signals, which are transmitted through one or more respective antennas. The payload data may be supplied by the controlling processor.

In some embodiments, the transmitter 530 may include digital transmit circuitry and second transmit circuitry. In these embodiments, the action of directing transmission may include: (1) directing the digital transmit circuitry to process the payload data to obtain samples for the $n^{th}$ slot of the given frame using first transmission parameters corresponding to said current transmit slot index, and (2) directing the second transmit circuitry to transmit said samples within the $n^{th}$ slot of the given frame using second transmission parameters corresponding to said current transmit slot index. The second transmit circuitry may include a digital-to-analog conversion unit and analog circuits (such as RF signal processing and amplification circuitry).

In some embodiments, the above-mentioned digital transmit circuitry includes a plurality of programmable hardware elements, in which case said directing transmission includes commanding a transfer of the first transmit parameters from a central transmit-parameter FIFO to the plurality of programmable hardware elements, wherein each programmable hardware element of said plurality is configured to perform at least a respective portion of said processing of the payload data.

In some embodiments, for each frame of the sequence of frames, the transmit scheduler 520 is configured to generate the first sequence of pulses so that a number of active clock edges between successive ones of the pulses is equal to a configurable slot size value. The controlling processor may supply the slot size value to the wireless access node 500.

In some embodiments, the wireless communication node is an access point of a wireless communication network.

In some embodiments, the wireless communication node is a user equipment (UE) device, which is configured to wirelessly communicate with an access point of a wireless communication network.

In one set of embodiments, a wireless communication node 550 may be configured as shown in FIG. 5B. The wireless communication node 550 may include a FIFO buffer 560, a receive counting unit 565, a receive scheduler 570 and a receive control unit 575, or any subset of the foregoing. (The node 550 may also include any subset of the features described above and described below in connection with FIGS. 6 through 8.)

The FIFO buffer 560 may be configured to receive one or more receive slot indices for a given frame in a sequence of frames. Each of the frames may include a common number $N_S$ of slots. The one or more receive slot indices indicate which of the $N_S$ slots of the given frame are to be receive slots. Each slot of the given frame may be assigned to be either a receive slot or a transmit slot. A controlling processor (e.g., a processor executing a real time operating system, or a host computer) may provide the one or more receive slot indices.

The receive counting unit 565 may be configured to cyclically increment a count value through a range of integers based on the configurable frame size in response to the active edges of the clock signal. For example, the receive counting unit 565 may cyclically count through the range
$\{0, 1, 2, \ldots, N_{Frame}-1\}$.

For each frame of the sequence of frames, the receive scheduler 570 may be configured to generate a sequence of $N_S$ pulses. Each pulse of the pulse sequence indicates the start of a corresponding slot within the frame. An initial one of the pulses of the sequence occurs when the count value equals a configurable start-of-frame (SOF) index. (This SOF index may be the same as the SOF index discussed above in connection with the transmit side of the scheduling system.)

For each pulse of the pulse sequence, the receive control unit 575 may be configured to: (a) determine if an index m of the pulse within the pulse sequence equals a current one of the receive slot indices; and (b) in response to determining that the index m of the pulse within the pulse sequence equals the current receive slot index, direct reception of payload data from the $m^{th}$ slot of the given frame. The wireless communication node 550 may include a receiver 580 configured to receive one or more analog signals from one or more respective antennas. The receiver may operate on one or more analog signals in order to receive the payload data from the $m^{th}$ slot of the given frame in response to one or more control signals asserted by receive control unit 575.

In some embodiments, the action of directing reception includes: (1) directing signal processing on one or more received analog signals using first receive parameters corresponding to the current receive slot index, to obtain samples for the $m^{th}$ slot; and (2) directing digital processing on the samples for the $m^{th}$ slot using second receive parameters corresponding to the current receive slot index, to obtain received payload data for the $m^{th}$ slot.

In some embodiments, an initial estimate of the start of frame index may be determined by performing on correlation processing performed on known pilots within an initial slot of an initial one of the frames.

In some embodiments, a fine adjustment of the start of frame index is received from an external agent, e.g., from the above-described controlling processor.

In some embodiments, the action of directing reception includes commanding a transfer of the second receive parameters from a central receive-parameter FIFO to a plurality of programmable hardware elements, wherein each programmable hardware element of said plurality is configured to perform at least a respective portion of said digital processing.

In some embodiments, the $N_S$ slots of each frame are time slots, or frequency slots, or time-frequency slots.

Real-Time Flexible Scheduler

In this section, we describe a real-time flexible scheduler for TDD and/or FDD communication between wireless nodes. (The scheduler may include any subset of features, elements and embodiments described above.) The following terminology is used.

Slot—the smallest unit of a frame that can be scheduled. In the context of TDD, a slot is a unit in time. In the context of FDD, a slot is a unit in frequency.

Map—defines the transmit-receive schedule for a plurality of slots. For each of a plurality of slots, the map identifies the slot as either a transmit slot or a receive slot. A transmit slot is a slot over which the wireless node will transmit. A receive slot is a slot over which the wireless node will receive.

Frame—comprises a configurable number of slots.

Once a map is determined, transmission and reception of slots takes place based on the map. For the purpose of this discussion, we will refer to communication between AP (Access point) and UE (User Equipment). However, the inventive principles described herein apply more generally to communication between any two communication nodes.

Each AP is assumed to service one or more UEs. Each UE aligns its timing to the AP, i.e., the AP is the master. This status as master also implies that the AP uses an absolute local time for its transmission. The AP can use a similar absolute time for reception. The UE performs synchronization with the AP as a first step for transmission or reception, and uses the synchronized timing to schedule its transmission or reception.

In some embodiments, this method assumes the use of multiple FPGAs, a host computer and a processor running a real-time operating system. The method described here aligns (i.e., synchronizes) the output of synchronous operations (performed on the FPGAs) and asynchronous operations (performed on a processor running a real time OS or Host PC) on parameters associated with transmission or reception of a slot of data, to take effect at a slot boundary via "trigger" mechanisms. A slot boundary is a boundary between two slots.

The real-time flexible scheduler for TDD and/or FDD may include one or more of the following components:
FIFO buffers local to each FPGA;
free-running modulo counters (one for transmit and one for receive);
scheduler;
check point;
transmit trigger; and
receive trigger.

Local FIFO Buffers

The local FIFO buffers collectively store sets of parameters for respective slots to be processed. Each parameter set is used to process the corresponding slot, i.e., used for transmission if the slot is a transmit slot, or used for reception if the slot is a receive slot. (Different FIFO buffers may store different subsets of a parameter set.) The local FIFO buffers are mainly divided into two groups, i.e., transmit FIFO buffers and receive FIFO buffers. The transmit FIFO buffers collectively store parameters sets for respective transmit slots. The receive FIFO buffers collectively store parameters sets for respective receive slots.

The following are examples of parameters:
an indicator of modulation and coding scheme (MCS);
transmit power-control parameters;
antenna parameters such as digital antenna gain and phase;
parameters to control steerable beams;
digital and/or analog receive AGC parameters;
RF frontend controls.
(AGC is an acronym for Automatic Gain Control.)

At each slot boundary, the parameters to be used in the next slot (for data transmission or data reception) are accessed from the plurality of local FIFOs. The local FIFOs may be populated by the RT processor running asynchronous to the FPGA clocks, but they are aligned with the map. (RT is an acronym for Real Time.) The map provides information on which slot indices will be set for transmission and which slot indices will be set for reception.

The transmit FIFOs are accessed at a slot boundary in response to a transmit trigger generated by a transmit control unit (e.g., by the transmit checkpoint of FIG. 6). The transmit trigger is preferably received simultaneously across all the FPGAs that contain the transmit FIFOs. (In some embodiments, the transmit trigger may be implemented as a PXIe trigger on National Instruments' PXIe chassis.) The accessed parameters are applied to the transmit process. Each transmit-related FPGA may perform a respective portion of the transmit process based on the one or more parameters accessed from the transmit FIFO(s) in that FPGA.

The receive FIFOs are accessed at a slot boundary in response to a receive trigger generated a receive control unit (e.g., by the receive checkpoint of FIG. 7). The receive trigger is preferably received simultaneously across all the FPGAs that contain the receive FIFOs. (In some embodiments, the receive trigger may be implemented as a PXIe trigger on National Instruments' PXIe chassis.) The accessed parameters are applied to the receive process. Each receive-related FPGA may perform a respective portion of the receive process based on the one or more parameters accessed from the receive FIFO(s) in that FPGA.

Free-Running Modulo Counters

In some embodiments, there are two free-running modulo counters, i.e., one dedicated for transmission and another dedicated for reception as shown respectively in FIGS. 6 and 7. Each modulo counter counts ticks of the FPGA clock that controls the FGPA processing loop. (This FPGA clock is related to the I/O sample clock. Each count of the FPGA clock indicates one or a fixed number of samples). These modulo counters provide an absolute reference for the scheduler. In some embodiments, these modulo counters are triggered ON one time, and then they keep running in a modulo fashion. (A modulo counter cyclically counts through a finite set of integer values: 0, 1, 2, . . . , ModuloSize−1. ModuloSize is programmable.)

ModuloSize defines the frame size. (In some embodiments, ModuloSize may be given in terms of the number of FPGA clock ticks equal to one frame.) There may be one value of ModuloSize for reception (denoted RX_MOD), and another value for transmission (denoted TX_MOD), since transmission and reception may have different I/O rates.

To support operation of the scheduler, each of the AP transmitter, the AP receiver, the UE transmitter and the UE receiver need to detect slot boundaries and frame boundaries. For a receiver (i.e., AP receiver or UE receiver), these boundaries may be determined by a Pilot Processing Unit (PPU) executing on the RT processor or host computer, by performing correlation processing on the pilots in the received signal(s). (A transmitting node embeds the pilots in the transmit signal(s) to enable system synchronization.)

Scheduler

Scheduler Inputs:
1. Start-of-Frame (SOF) index (specifies the start of frame relative to the zero of the modulo counter). The SOF index may be specified in the same units used by the modulo counter, e.g., in terms of a number of FPGA clock ticks.

The SOF index value (start of transmission) of the AP transmitter is fixed. (The host sends the SOF index only once). In one implementation, the SOF index value is chosen such that when the first sample of the first slot of frame reaches the D/A conversion unit, the modulo counter value is zero. This SOF index is used as an absolute reference.

The SOF index values of the AP receiver, the UE transmitter and the UE receiver are determined by synchronization procedures at the PPU.

2. Slot period—The duration of a slot. The slot period may be specified in the same units used by the modulo counter, e.g., in terms of a number of FPGA clock ticks.

The slot period value of the AP transmitter is fixed.

The slot period value of the AP receiver can safely be fixed. (Assume that the UE aligns its transmission via timing advance or some other mechanism, ensuring reception at the AP within the acceptable RX schedule.)

The slot period values of the UE transmitter and UE receiver are provided/updated from the host computer (or RT processor) based on the synchronization algorithms/mechanisms.

3. Scheduler Enable—enables operation of the scheduler. The transmit scheduler is enabled by a TX enable signal, and the receive scheduler is enabled by a RX enable signal. (See FIGS. 6 and 7.) The enable signals are sent by the host computer (or RT processor.

4. Modulo counter index, i.e., the count value of the modulo counter. The modulo counter index is obtained from the modulo counter.

Scheduler Function:

The scheduler is enabled from the host computer (or the RT processor). When the scheduler is enabled, the scheduler performs the following.

(a) The scheduler latches in the current values of the SOF index and slot period provided by the host computer (or the RT processor, or an FPGA such as the MAC support FPGA);

(b) The scheduler compares the integer part of the "SOF index" against the count value of the modulo counter. When they match, the scheduler generates $N_S$ pulses, where $N_S$ is the number of slots per frame, with inter-pulse period equal to the slot period value (fractional) coming from the host computer (or the RT processor).

(c) The scheduler continues the process as long as it is enabled.

In some embodiments, the scheduler always finishes one frame worth of pulses even when disable is set in the middle of the generation of the $N_S$ pulses. Enable is checked again before the next set of pulses for the next frame is initiated.

Aligning Scheduler and Actual Map:

On AP side, the map and the scheduler are aligned both for AP transmission and AP reception.

On UE side, the SOF index may be adjusted based on the information from the first decoded slot. It is assumed that slots contain either a slot number or some specific information that can be used to identify the decoded slot uniquely, referred to here as the SFI (Slot Format Indicator). Note that the decoding of the slot to obtain the slot number can take place on the FPGA or on the host computer (or RT processor). The following given below will enable: (a) decoding of the first slot after synchronization to obtain the slot index from the SFI; and (b) update of the SOF index based on the decoded information, and update of the slot period based on the output of the Pilot Processing Unit (PPU).

(1) Initially set the SOF Index and the slot period by referencing them from the detected pilots slots (obtained from the PPU).

(2) Temporarily enable the receive scheduler to generate slot pulses, thus enabling the demodulator and decoder to start operating.

(3) Setup the decoder and demodulator to demodulate and decode the first slot (or all slots of the frame).

(4) From the decoded SFI result, the slot # offset is obtained. This offset represents a refined SOF index.

(5) Disable the scheduler.

(6) Update the SOF index and the slot period based on the information determined above.

(7) Enable the scheduler.

Check Point

On the transmitter side, the transmit check point checks the following.

(1) The local FIFO denoted "FIFO_slot#" contains the slot indices for slots that need to be transmitted within a pre-defined duration (e.g., within a frame). Note that this FIFO contains all slot indices designated by the map for transmission. The FIFO may be pre-fetched by one entry to get the next slot number to be transmitted. Let $n_k$ denote this next slot number.

(2) Check if the slot number n of the current pulse from the transmit scheduler equals $n_k$ mod Frame Size, and check if the FIFO containing the data to be transmitted (i.e., the modulation output FIFO) has reached a certain threshold (i.e., if the amount of data in the modulation output FIFO is greater than or equal the certain threshold).

(3) If both checks return positive, transmission starts by performing the following:
  a. Send a delayed trigger signal to the transmit-related FPGAs to access parameters for slot n from the corresponding local FIFOs (e.g. antenna parameters, transmit power parameter, etc.)
  b. Issue a strobe to indicate an open gate to start transmission on the $n^{th}$ slot.

(4) If the logical AND of the two checks in step (2) returns negative, transmission will be scheduled for the same slot in the next frame.

On the receiver side, the receive check point checks the following.

(1) Pre-fetch the local FIFO denoted FIFO_Slot# to obtain the slot number $m_k$ of the next slot to be received.

(2) Check if the slot number m of the current pulse from the receive scheduler is equal to $m_k$ mod Frame size.

(3) If the check (2) returns positive, the receive check point performs the following:
  a. Send a delayed trigger signal to a MAC Support FPGA to access parameters for reception of slot m, e.g., an AGC parameter. (MAC is an acronym for Media Access Control.)
  b. Release the time stamp of slot m for demodulation.

The FPGAs remain in an error free state even if host computer (or RT processor) misses the timing. Later adjustments can all be performed on the host computer (or RT processor).

Scheduler Reset Mechanism

The system is configured to handle error conditions, e.g. CRC failure.

On the transmit side, error conditions are handled as follows.

(1) The host computer (or RT processor) will stop sending new transmit requests to slot# FIFO.

(2) The scheduler continues to run with the nominal SOF index and slot period (3) The modulation output FIFO remains open, but the path from the modulation output FIFO to the DAC is closed. In other words, the modulation output FIFO continues to received sample data, but sample data is not allowed to flow from the modulation output FIFO to DAC.

(4) All the remaining requests in the slot# FIFO of the transmit scheduler will be exhausted.

(5) Then disable the transmit scheduler.

On the receive side, error conditions are handled as follows.

(1) The host computer (or RT processor) will stop sending new receive requests to the slot# FIFO.

(2) The receive scheduler continues to run with the nominal SOF index and slot period.

(3) The host computer (or RT processor) reads out all the decoded data and discards them.

(4) Continue until all the remaining requests in the slot# FIFO are exhausted (5) Disable the receive scheduler.

As long as all the local FIFOs are synchronized, this method will work as a system reset method.

Transmitter Side Scheduling

FIG. 6 shows the transmitter side of a wireless communication node configured to perform flexible real-time scheduling, according to one embodiment. The host computer (or RT processor) 605 sends various information to unit 610, encoder FPGA 615 and modulation FPGA 620. Unit 610 receives payload data (to be transmitted in a scheduled slot), antenna information, MCS, etc. Encoder FPGA 615 receives control data for encoding slot payload. Modulation FPGA receives MCS, transmit slot number (slot #), start-of-frame (SOF) index, slot period and TX enable.

Unit 610 includes: a FIFO 612 for storing encoder control parameters; and a FIFO 613 for storing parameters such as antenna information, MCS, etc. Unit 610 may be implemented by an FPGA, and may be referred to herein as the "MAC Support FPGA". MAC is an acronym for "Media Access Control".

Encoder FPGA 615 received payload data for a slot from unit 610, and encoded the payload data using control data corresponding to the slot. Encoder FPGA includes a FIFO 615 for data, and a FIFO 617 for encoder control parameters to configure the encoder.

Modulation FPGA 620 includes transmit modulo counter 625, transmit scheduler 630, transmit checkpoint 635 and a FIFO (denoted FIFO_Slot#) for storing transmit slot numbers. (See the above discussion of these elements). The modulation FPGA 620 also includes modulation unit 622, MCS FIFO 623 and modulation output FIFO 624. The modulation unit performs modulation and coding for a given slot based on the corresponding MCS accessed from the MCS FIFO 623.

Receiver Side Scheduling

FIG. 7 shows the receiver side of a wireless communication node configured to perform flexible real-time scheduling, according to one embodiment. The host computer (or RT processor) 605, i.e., the same host computer (or RT processor) as shown in FIG. 6, receives slot payload data from unit 710 and/or from decoder FPGA 715, and sends various information to unit 710, decoder FPGA 715 and demodulation FPGA 720. Unit 710 receives AGC and MCS parameters. Decoder FPGA 715 receives control data for decoding slot data. Demodulation FPGA 720 receives MCS, timing offset, receive slot number (slot #), start-of-frame (SOF) index, slot period and RX enable.

The demodulation FPGA 720 includes receive modulo counter 725, peak detection unit 727, scheduler 730, receive checkpoint 735 and a FIFO (denoted FIFO_Slot#) for storing the receive slot number(s). See the above discussion of these elements. The demodulation FPGA also includes a parameter FIFO 723, demodulation unit 722 and a time stamp unit 740. The time stamp unit appends a time stamp to a received slot of ADC samples to indicate the indices of the ADC samples relative to the slot and frame in which they reside. This data may be useful to the host computer when performing further analysis. (The samples are supplied by an analog-to-digital conversion ADC unit.)

The peak detection unit 727 may generate an initial estimate of the SOF index and slot period by performing correlation processing to detect one or more pilots occurring in an initial slot. (The location of the pilots is estimated by the location of a strong peak in the correlation. The location of the pilots indicates the location of the start of frame.) The peak index corresponding to the pilot(s) may be sent to the host computer 605.

The demodulation unit 722 performs demodulation on the samples for a received slot using demodulation parameters (e.g., MCS and timing offset) for the slot, to obtain demodulated data. The demodulation parameters are accessed from FIFO 723.

The decoder FPGA 715 performs decoding on the demodulated data for the slot using control information for the slot, to obtain payload data. FIFO 716 is used for configuration information for the decoder. The payload data is supplied to unit 710.

Unit 710 includes a FIFO 712 for storing the automatic gain control (AGC) parameter per slot and a FIFO 713 for storing decoder configuration information. The control signal (Ctrl) sent by unit 710 is used to control the RF circuitry and the channel decoder. Host computer 605 may access the payload data from unit 710.

In some embodiments, unit 710 may be implemented in an FPGA. In one embodiment, unit 710 and unit 610 (of FIG. 6) are implemented in the same FPGA.

Software Configurability

The host computer (or other computer) may provide a software environment in which a user may conveniently configure the flexible real-time scheduler and the frame structure to be realized by said scheduler. The software environment allows the user to specify the parameters that determine the frame structure and the various parameters that determine the processing behavior of digital and/or analog circuitry of the transmitter and/or receiver. In some embodiments, the software environment may be realized in terms of a graphical programming language such as LabVIEW and/or LabVIEW FGPA. For example, a block may be provided specifically for the purpose of instantiating an instance of the scheduler as part of a graphical program. The user may drag and drop the block from a pallet of tools onto a block diagram, and specify the frame structure parameters and said behavior parameters by interaction (e.g., mouse and keyboard interactions) with the block. When the host computer executes the block diagram, the host computer automatically configures a set of FPGAs to implement the schedulers and the specified frame structure for transmission and/or reception.

Figure 8:
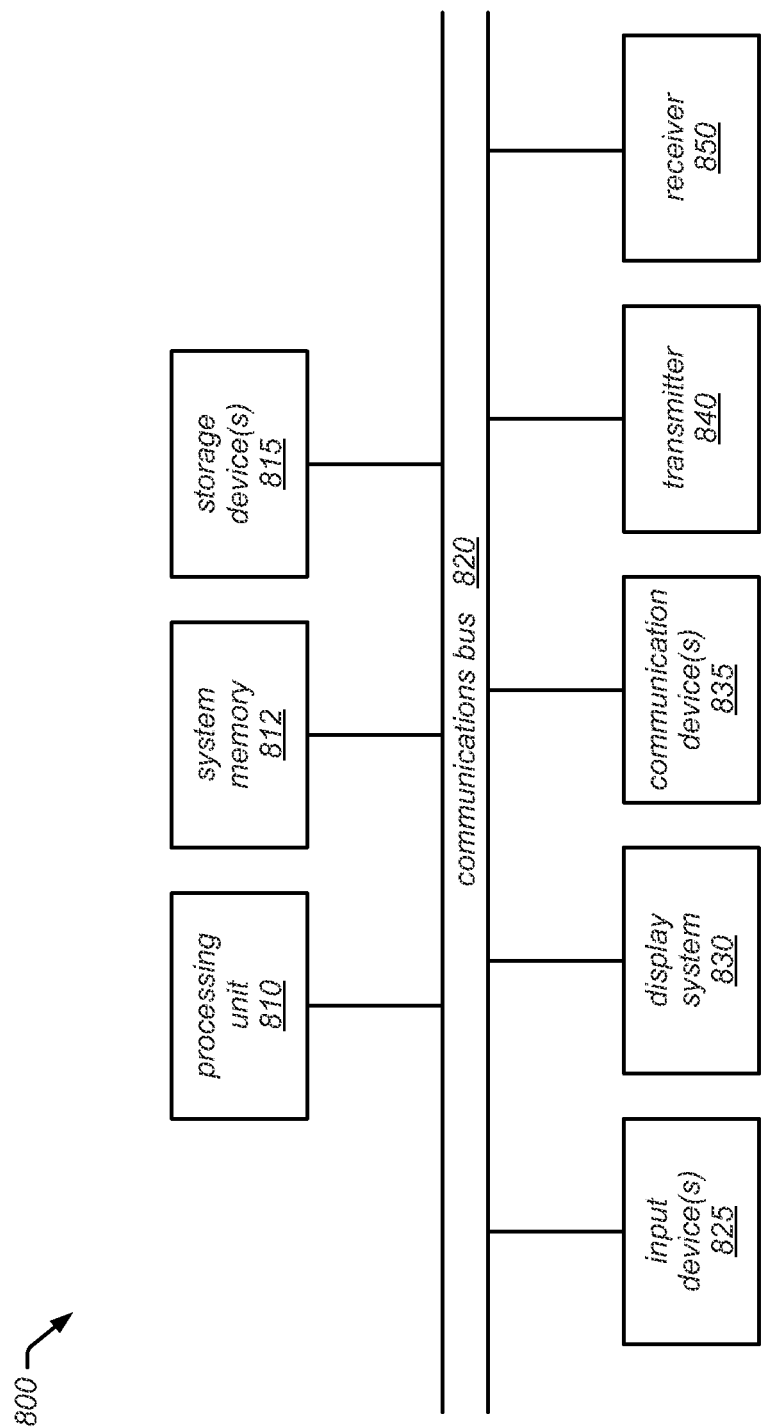
FIG. 8 illustrates a block diagram of a computer system that may be employed to perform any of the method embodiments described herein.

FIG. 8: Computer System

FIG. 8 illustrates one embodiment of a computer system 800 that may be used to perform any of the method embodiments described herein, or, any combination of the method embodiments described herein, or any subset of any of the method embodiments described herein, or, any combination of such subsets.

Computer system 800 may include a processing unit 810, a system memory 812, a set 815 of one or more storage devices, a communication bus 820, a set 825 of input devices, and a display system 830.

System memory 812 may include a set of semiconductor devices such as RAM devices (and perhaps also a set of ROM devices).

Storage devices 815 may include any of various storage devices such as one or more memory media and/or memory access devices. For example, storage devices 815 may include devices such as a CD/DVD-ROM drive, a hard disk, a magnetic disk drive, magnetic tape drives, semiconductor-based memory, etc.

Processing unit 810 is configured to read and execute program instructions, e.g., program instructions stored in system memory 812 and/or on one or more of the storage devices 815. Processing unit 810 may couple to system memory 812 through communication bus 820 (or through a system of interconnected busses). The program instructions configure the computer system 800 to implement a method, e.g., any of the method embodiments described herein, or, any combination of the method embodiments described herein, or, any subset of any of the method embodiments described herein, or any combination of such subsets.

Processing unit 810 may include one or more processors (e.g., microprocessors).

One or more users may supply input to the computer system 800 through the input devices 825. Input devices 825 may include devices such as a keyboard, a mouse, a touch-sensitive pad, a touch-sensitive screen, a drawing pad, a track ball, a light pen, a data glove, eye orientation and/or head orientation sensors, a microphone (or set of microphones), or any combination thereof.

The display system 830 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 800 may include other devices, e.g., devices such as one or more graphics accelerators, one or more speakers, a sound card, a video camera and a video card.

In some embodiments, computer system 800 may include one or more communication devices 835, e.g., a network interface card for interfacing with a computer network. As another example, the communication device 835 may include a specialized interface for communication via any of a variety of established communication standards or protocols (e.g., USB, Firewire, PCI, PCI Express, PXI, Bluetooth, WiFi, LTE, WiMax, GSM).

The computer system may be configured with a software infrastructure including an operating system, and perhaps also, one or more graphics APIs (such as OpenGL®, Direct3D, Java 3D™). In some embodiments, the software infrastructure may include National Instruments LabVIEW™ software, and/or, LabVIEW™ FPGA.

In some embodiments, the computer system 800 may be configured for coupling to transmitter 840. The transmitter may be configured to transmit one or more signals onto a communication channel. The transmitter may include: digital processing circuitry; digital-to-analog conversion circuitry; RF upconversion and amplification circuitry configured to convert baseband signal(s) into RF signal(s), to facilitate transmission through the channel. (The digital processing circuitry may include one or more programmable hardware elements, one or more microprocessors, one or more dedicated digital circuits such as ASICs, or any combination of the foregoing.) The channel may be a wireless channel or a wired channel. The transmitter may operate under the control of the software executing on processor 810 and/or software executing on the transmitter itself.

In some embodiments, the computer system 800 may be configured to interface with a receiver 850. The receiver may be configured to receive one or more RF signals from the channel. The receiver may include: RF amplification circuitry; local oscillator circuitry for generating a local carrier signal; down-conversion circuitry for converting received RF signal(s) into baseband signal(s); and an analog-to-digital conversion circuitry for sampling the baseband signal(s). The receiver may also include digital processing circuitry for performing digital processing on the samples of the baseband signal(s). The digital processing circuitry may include one or more programmable hardware elements, one or more microprocessors, one or more dedicated digital circuits such as ASICs, or any combination of the foregoing.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for operating a wireless communication node to enable dynamic control of frame structure, wherein the wireless communication node comprises one or more antennas configured to transmit and receive wireless communications, and one or more processors coupled to the one or more antennas, the method comprising, by the one or more antennas and the one or more processors:

(a) receiving a set of one or more transmit slot indices for a given frame in a sequence of frames, wherein each of the frames includes a common number $N_S$ of slots, wherein the one or more transmit slot indices indicate which of the $N_S$ slots of the given frame are to be transmit slots;

(b) generating a first sequence of $N_S$ pulses for the given frame, wherein each pulse of said first sequence indicates a start of a corresponding slot within the given frame;

(c) for each pulse of the first sequence, performing operations including:

determining if an index n of the pulse within the first sequence equals a current one of the transmit slot indices; and in response to determining that the index n of the pulse within the first sequence equals the current transmit slot index, processing payload data using the one or more processors to obtain samples for the $n^{th}$ slot of the given frame using first transmission parameters corresponding to said current transmit slot index, and transmitting said samples using the one or more antennas within the $n^{th}$ slot of the given frame using second transmission parameters corresponding to said current transmit slot index.

2. The method of claim 1, wherein the wireless communication node is an access point of a wireless communication network.

3. The method of claim 1, wherein the wireless communication node is a user equipment (UE) device, which is configured to wirelessly communicate with an access point of a wireless communication network.

4. The method of claim 1, further comprising:

receiving one or more receive slot indices for the given frame, wherein the one or more receive slot indices indicate which of the $N_S$ slots of the given frame are to be receive slots, wherein each slot of the given frame is assigned to be either a receive slot or a transmit slot;

generating a second sequence of $N_S$ pulses for the given frame, wherein each pulse of said second sequence indicates the start of the corresponding slot within the given frame;

for each pulse of the second sequence, performing operations including:

determining if an index m of the pulse within the second sequence equals a current one of the receive slot indices;

in response to determining that the index m of the pulse within the second sequence equals the current receive slot index, processing one or more received analog signals using first receive parameters corresponding the current receive slot index to obtain samples for the $m^{th}$ slot, and processing the samples for the $m^{th}$ slot using second receive parameters corresponding to the current receive slot index to obtain received payload data for the $m^{th}$ slot.

5. The method of claim 4, wherein the first receive parameters include:
one or more automatic gain control values for one or more respective analog amplifiers that amplify the one or more received analog signals.

6. The method of claim 4, wherein the second receive parameters include:
a modulation and coding scheme (MCS) used by a demodulation unit to demodulate the samples for the $m^{th}$ slot to obtain demodulated data for the $m^{th}$ slot; and/or
one or more decoder control parameters used by a decoder unit to perform decoding on the demodulated data to obtain the received payload data for the $m^{th}$ slot.

7. The method of claim 1, wherein the first transmit parameters include:
one or more encoder control parameters used by an encoder unit to perform encoding on the payload data to obtain encoded data; and/or
a modulation and coding scheme (MCS) used by a modulation unit to modulate the encoded data to obtain said samples for the $n^{th}$ slot.

8. The method of claim 1, wherein the second transmit parameters include:
one or more transmit power parameters used by one or more respective RF amplifiers to transmit the samples within the $n^{th}$ slot; and
one or more antenna parameters used by beam steering circuitry to steer an RF beam.

9. The method of claim 1, further comprising:
performing steps (a), (b) and (c) for each of the frames in said sequence of frames, wherein the set of one or more transmit slot indices changes between said given frame and a second of the frames of the sequence.

10. The method of claim 1, wherein each of the $N_S$ slots in each frame has the same size $N_{SlotSize}$, the method further comprising:
receiving the common number $N_S$ as an input parameter, receiving the size $N_{SlotSize}$; and
configuring a counting unit to cyclically count through a range of integer values corresponds to a frame size, wherein the frame size is equal to the product of the common number $N_S$ and the size $N_{SlotSize}$.

11. The method of claim 1, wherein the $N_S$ slots of each frame are time slots, or frequency slots, or time-frequency slots.

12. A wireless communication node comprising:
one or more antennas configured to transmit and receive wireless communications, and one or more processors coupled to the one or more antennas, wherein the one or more antennas and the one or more processors are configured to:
receive a set of one or more transmit slot indices for a given frame in a sequence of frames, wherein each of the frames includes a common number $N_S$ of slots, wherein the one or more transmit slot indices indicate which of the $N_S$ slots of the given frame are to be transmit slots;
cyclically increment a count value through a range of integers based on a configurable frame size in response to active edges of a clock signal;
for each frame of said sequence of frames, generate a first sequence of $N_S$ pulses, with each pulse of the first sequence indicating a start of a corresponding slot within the frame, wherein an initial one of the pulses of the first sequence occurs when the count value equals a first configurable start-of-frame (SOF) index; and
for each pulse of the first sequence:
determine, by the one or more processors, if an index n of the pulse within the first sequence equals a current one of the transmit slot indices; and
in response to determining that the index n of the pulse within the first sequence equals the current transmit slot index, direct transmission of payload data using the one or more antennas within the $n^{th}$ slot of the given frame.

13. The wireless communication node of claim 12, wherein the wireless communication node is an access point of a wireless communication network.

14. The wireless communication node of claim 12, wherein the wireless communication node is a user equipment (UE) device, which is configured to wirelessly communicate with an access point of a wireless communication network.

15. The wireless communication node of claim 12, wherein the one or more antennas and the one or more processors are further configured to:
receive one or more receive slot indices for the given frame, wherein the one or more receive slot indices indicate which of the $N_S$ slots of the given frame are to be receive slots, wherein each slot of the given frame is assigned to be either a receive slot or a transmit slot;
cyclically increment a second count value through the range of integers based on the configurable frame size in response to the active edges of the clock signal;
for each frame of said sequence of frames, generate a second sequence of $N_S$ pulses, with each pulse of the second sequence indicating the start of the corresponding slot within the frame, wherein an initial one of the pulses of the first sequence occurs when the second count value equals a second configurable start-of-frame (SOF) index; and
for each pulse of the second sequence:
determine, by the one or more processors, if an index m of the pulse within the second sequence equals a current one of the receive slot indices; and
in response to determining that the index m of the pulse within the second sequence equals the current receive slot index, direct reception of payload data by the one or more antennas from the $m^{th}$ slot of the given frame.

16. The wireless communication node of claim 15, wherein said directing reception includes:
directing signal processing on one or more received analog signals using first receive parameters corresponding to the current receive slot index, to obtain samples for the $m^{th}$ slot; and
directing digital processing on the samples for the $m^{th}$ slot using second receive parameters corresponding to the current receive slot index, to obtain received payload data for the $m^{th}$ slot.

17. The wireless communication node of claim 15, wherein an initial estimate of the second start of frame index is determined based on correlation processing performed on known pilots within an initial slot of an initial one of the frames.

18. The wireless communication node of claim 17, wherein a fine adjustment of the second start of frame index is received from an external agent.

19. The wireless communication node of claim 15, wherein said directing reception includes commanding a transfer of the second receive parameters from a central receive-parameter FIFO to a plurality of programmable hardware elements, wherein each programmable hardware element of said plurality is configured to perform at least a respective portion of said digital processing.

20. The wireless communication node of claim 12, wherein the $N_S$ slots of each frame are time slots, or frequency slots, or time-frequency slots.

* * * * *